INVENTOR.
EDWIN W. WEBB.
BY HIS ATTORNEYS.
Williamson & Williamson

INVENTOR.
EDWIN W. WEBB.
BY HIS ATTORNEYS.
Williamson & Williamson

Patented Jan. 17, 1933

1,894,385

UNITED STATES PATENT OFFICE

EDWIN W. WEBB, OF CHICAGO, ILLINOIS, ASSIGNOR TO STANDARD CAR TRUCK COMPANY, OF CHICAGO, ILLINOIS, A CORPORATION OF NEW JERSEY

SPRING DAMPING CAR TRUCK

Application filed February 13, 1932. Serial No. 592,721.

This invention relates to spring damping means for car trucks.

It is the general object of the invention to provide novel and improved means for checking or damping the action of the bolster springs of a car truck as forces tending to compress these springs are increased.

It is another object to provide in combination with said damping means, means for supporting the truck bolster to permit of lateral motion of the same transversely of the truck.

Figure 1:
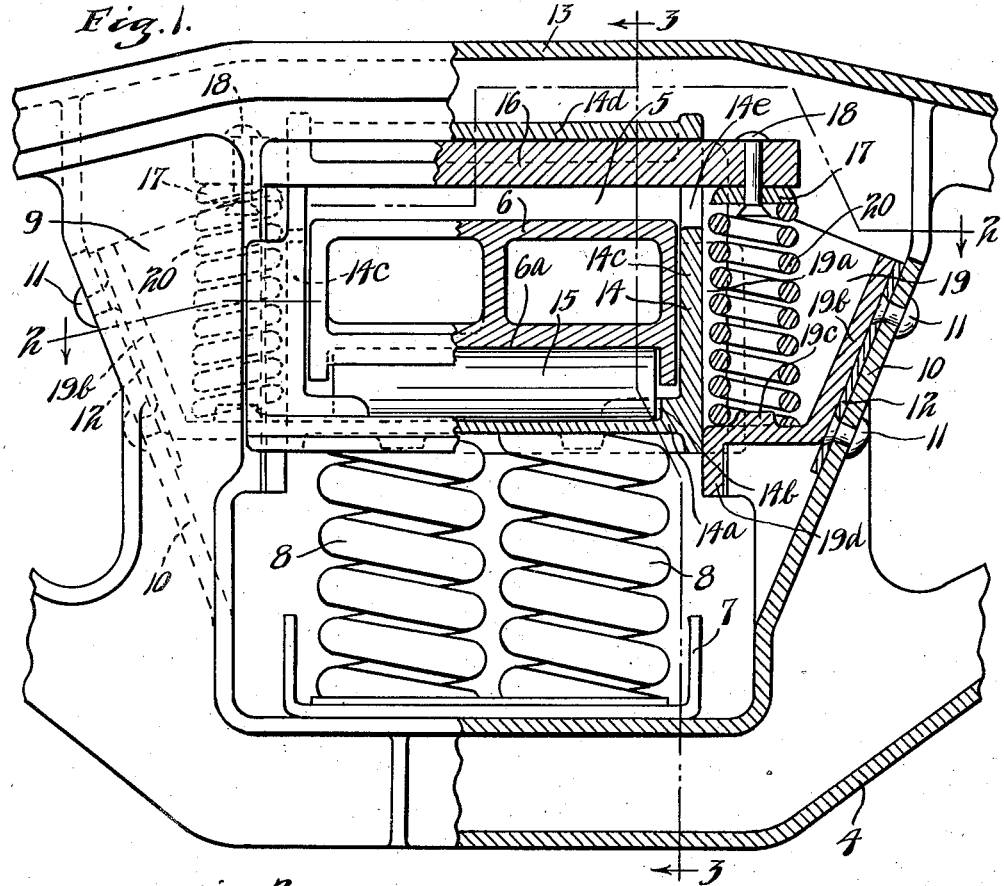
Figure 2:
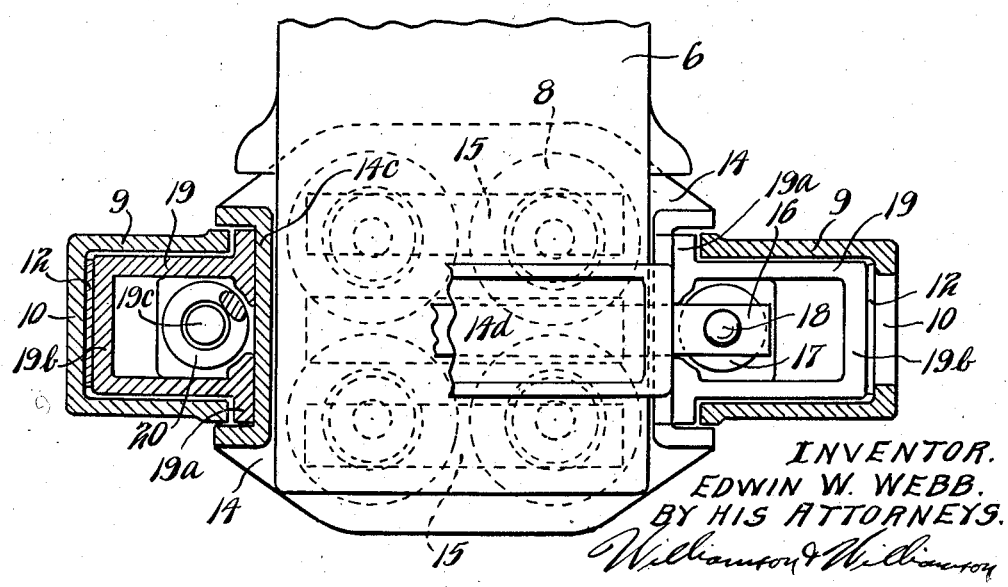
Figure 3:
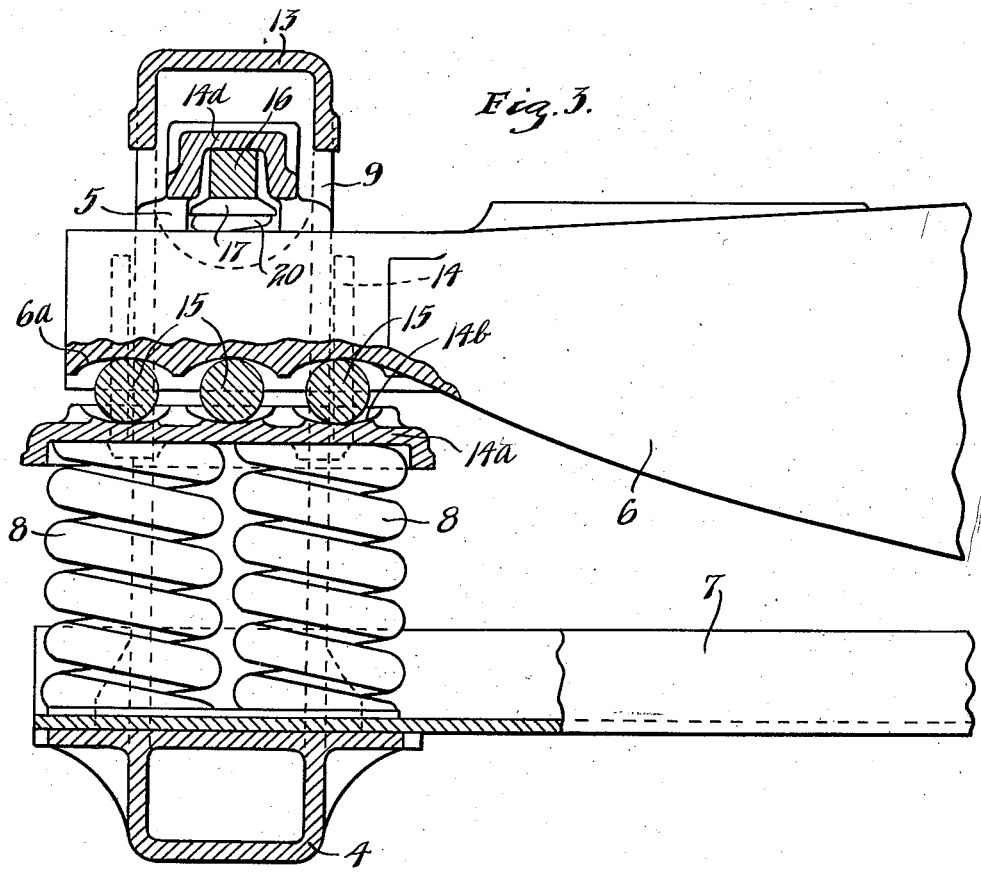

To these ends, generally stated, the invention consists in the novel parts and novel combinations of parts, hereinafter defined in the claims and described in the following specification, made in connection with the accompanying drawings, wherein like reference characters refer to the same or similar parts throughout the various views, and, in which, Fig. 1 is a view partly in side elevation and partly in vertical longitudinal section, taken through portions of a car truck wherein the present invention is embodied;

Fig. 2 is a horizontal section taken substantially on the line 2—2 of Fig. 1, as indicated by the arrows; and Fig. 3 is a vertical transverse section taken substantially on the line 3—3 of Fig. 1, as indicated by the arrows.

Referring to the drawings, portions of a car truck are illustrated which include a side frame 4 having a bolster opening 5 within which one end of a car truck bolster 6 is disposed. One end of a spring plank 7, disposed within the bolster opening 5, rests on the side frame 4 and a group of coiled bolster springs 8 are supported at their lower ends within the bolster opening on this end of the spring plank 7. Bolster columns are formed by vertical side webs 9 integral with the side frame 4 and cross webs 10 joining the side webs 9. These cross webs 10 run at sharp angles to the vertical upwardly and outwardly toward the ends of the side frame 4 from adjacent the bottom of the bolster opening 5. The inner surface of each cross web 10 lies in a true plane and secured to the cross webs 10 against the inner surfaces thereof as by rivets 11 are wear plates 12. The side frame 4 forms an arch bar 13 of channel shape in vertical cross section, which traverses the upper portion of the bolster opening 5.

A combination roller seat and chafing member 14 is disposed within the bolster opening 5 and this member has a horizontal bottom 14a which rests upon the upper ends of the bolster springs 8. Laterally spaced roller contours 14b are formed on the upper surface of the bottom 14a and supported within these contours are lateral motion rollers 15 which fit within laterally spaced roller contours 6a formed on the bottom surface of the end of bolster 6. The end of the bolster 6 is accordingly supported for lateral motion transversely of the truck and relative to the side frame 4 by the rollers 15 resting on the combination roller seat and chafing member 14 which is, in turn, supported by the bolster springs 8. The chafing member 14 has vertical sides 14c of channel-shape in horizontal cross section which partially receive the inner edges of the side webs 9 of the bolster columns. The two sides 14c of the chafing member are interconnected in spaced relation above the bolster 6 by a top 14d of channel-shape in vertical cross section. Slots 14e are formed in the sides 14c immediately below the upper web of the channel-shaped top 14d and a bar 16 fits within the channel of the top 14d and has ends which project outwardly through the slots 14e beyond the sides 14c of the chafing member. Spring caps 17 are secured to the ends of this bar 16 as by means of rivets 18.

Interposed between the sides 14c of the chafing member 14 and the wear plates 12 are wedges 19 of general cup-shape. These wedges 19 have heavy inner vertical ribs 19a which bear against the sides 14c of the chafing member 14 and are located between the inner edges of the webs 9 and the sides 14c. The wedges 19 have outer sides 19b paralleling the cross webs 10 of the bolster columns and bearing against the wear plates 12. Coiled springs 20 fit within the recesses of the cup-like wedges 19, have bearings at their lower ends against bottom horizontal surfaces of the wedges and have bearing at their upper ends against the spring caps 17. Lateral displacement of the lower ends of the springs 20 is prevented by means of lugs 19c formed on the bottoms of the wedges 19. The wedges 19 have down turned flanges 19d joining the inner edges of the bottoms of the wedges and interconnecting the ribs 19a and working against the sides 14c.

It will be understood that the opposite end of the bolster 6 from the end shown in the drawings will be supported by a side frame structure which is a duplicate of the structure described and illustrated.

When the car truck is in service, as the wheels of the truck run over high spots on the rails, the bolster springs 8 will be compressed thereby causing the end of the bolster 6 supported by the side frame 4, to lower somewhat relative to the side frame to move the chafing member 14 downwardly somewhat relative to the bolster columns formed by the side webs 9 and cross webs 10. The bar 16 will be moved downwardly with the chafing member 14 and will, accordingly, exert pressure to compress the springs 20, thereby tending to move the wedges 19 downwardly relative to cross webs 10. The wedges 19 accordingly will be urged into tighter engagement with the sides 14c of the chafing member and with the wear plates 12. The frictional engagement of the ribs 19a with the sides 14c of the chafing member offers resistance to the downward movement of the chafing member relative to side frame 4, and thus damps the compressive action of the springs 8. The added resistance offered by the wedges 19 to the compressive movement of the springs 8 increases tremendously as the forces tending to compress the springs 8 are increased. In other words, as the springs 8 are increasingly compressed, the added resistance offered by the wedges to the compressive movement of the springs will be much more than directly proportional to the increase in the forces tending to compress the springs. The angle formed by the webs 12 with the vertical is preferably such as to furnish maximum frictional resistance to sliding movement of the ribs 19a relative to the sides 14c of the chafing member, without causing sticking of the parts.

At all times, the truck bolster 6 will have freedom for lateral motion transversely of the truck and relative to the side frames 4. The lateral motion rollers 15 supported on the combination roller seat and chafing members and, in turn, supporting the ends of the truck bolster 6, make this lateral motion of the truck bolster possible.

It will be apparent that if it is desired to eliminate the lateral motion feature of the present truck, this can easily be done by modifying the construction slightly. The words "truck bolster structure" as used in the claims are to be construed broadly enough to cover any suitable bolster such as an ordinary bolster not equipped with the combination roller seat and chafing members 14, and rollers 15, as well as a bolster construction including such parts as bolster 6 combination roller seat and chafing members 14 and rollers 15.

It will, of course, be understood that various changes may be made in the form, details, arrangement and proportions of the various parts, without departing from the scope of the present invention.

What is claimed is:

1. In a car truck, side frames having bolster openings, a truck bolster structure having its ends disposed within said bolster openings, springs supporting the ends of said bolster structure from said side frames, wedges interposed between the sides of said bolster structure and portions of said side frames, and resilient means reacting between said wedges and said bolster structure to urge said wedges into tighter wedging relation as said springs are increasingly compressed.

2. In a car truck, side frames having bolster openings, a truck bolster structure having ends disposed within said bolster openings, means for supporting the ends of said bolster structure from said side frames to permit of relative vertical movement between said bolster structure and said side frames, wedges interposed between the sides of the ends of said bolster structure and portions of said side frames and resilient means reacting in a vertical direction between the ends of said truck bolster structure and said wedges to force said wedges into tighter wedging relation with the sides of the ends of said bolster structure as relative vertical movement between said bolster structure and said side frames takes place in one direction.

3. In a car truck, side frames having bolster openings, a truck bolster structure having its ends disposed within said bolster openings, springs supporting the ends of said bolster structure from said side frames, said side frames having webs extending diagonally upwardly and away from the sides of said bolster structure, wedges interposed between said webs and the sides of said bolster structure and resilient means reacting between the ends of said bolster structure and said wedges to force said wedges into tighter wedging relation as said springs are increasingly compressed.

4. In a car truck, side frames having bolster openings, a truck bolster having its ends disposed within said bolster openings, springs supported within said bolster openings by said side frames, chafing members supported by said springs and in turn supporting the ends of said bolster, wedges interposed between the sides of said chafing members and portions of said side frames and springs reacting between said chafing members and said wedges to urge said wedges into tighter wedging relation as said first mentioned springs are increasingly compressed.

5. In a car truck, side frames having bolster openings, a bolster having ends disposed within said bolster openings, bolster springs supported by said side frames, chafing members resting on said springs and forming lateral motion roller seats, lateral motion rollers interposed between said chafing members and the ends of said bolster, wedges interposed between the sides of said chafing members and portions of said side frames, and springs reacting in a vertical direction between said chafing members and said wedges to force said wedges into tighter wedging relation as said bolster springs are increasingly compressed.

6. In a car truck, side frames having bolster openings, a truck bolster having ends disposed within said bolster openings, bolster springs supported by said side frames, chafing members supported by said bolster springs and having openings therein within which the ends of said bolster are received, lateral motion rollers interposed between said chafing members and the ends of said bolster to permit of lateral motion of said bolster relative to said side frames, wedges interposed between the sides of said chafing members and portions of said side frames, and springs reacting between said chafing members and said wedges in a vertical direction to urge said wedges into tighter wedging relation as said bolster springs are compressed.

7. In a car truck, side frames having bolster openings, a truck bolster having ends disposed within said openings, bolster springs supported by said side frames, chafing members supported by said springs and having openings therein through which the ends of said bolster project, lateral motion rollers interposed between said chafing members and the ends of said bolster, wedges interposed between the sides of said chafing members and portions of said side frames, the sides of said chafing members having slots therein above the ends of said bolster, bars extending through said slots and springs reacting between the ends of said bars and said wedges to urge said wedges into tighter wedging relation as said bolster springs are increasingly compressed.

8. The structure defined in claim 6, said wedges being cupped to receive the last mentioned springs.

9. In a car truck, side frames having bolster openings, and diagonally upwardly inclined surfaces projecting outwardly from the lower ends of said bolster openings, bolster springs supported by said side frames, chafing members supported by said bolster springs, lateral motion devices supporting the ends of said bolster from said chafing members, wedges interposed between said diagonally inclined surfaces and the sides of said chafing members and springs reacting vertically between said chafing members and said wedges and urging said wedges into tighter wedging relation as said bolster springs are increasingly compressed.

In testimony whereof I affix my signature.

EDWIN W. WEBB.